Nov. 26, 1968 A. J. ZIMMERMAN 3,413,655

BINARY CODE MAGNETIC RECORDING CIRCUITRY

Filed Jan. 5, 1966 2 Sheets-Sheet 1

Arlen J. Zimmerman,
INVENTOR.

BY Harry M. Saragovitz
Edward J. Kelly
Herbert Berl
Alfred E. Smith

BINARY CODE MAGNETIC RECORDING CIRCUITRY

Filed Jan. 5, 1966 2 Sheets-Sheet 2

Arlen J. Zimmerman
INVENTOR.

BY Harry M. Saragovitz
Edward J. Kelly
Herbert Berl
Alfred E. Smith

United States Patent Office 3,413,655
Patented Nov. 26, 1968

3,413,655
BINARY CODE MAGNETIC RECORDING CIRCUITRY

Arlen J. Zimmerman, Minneapolis, Minn., assignor, by mesne assignments, to the United States of America as represented by the Secretary of the Army
Filed Jan. 5, 1966, Ser. No. 519,173
7 Claims. (Cl. 346—74)

This invention relates to an apparatus and method for magnetizing or demagnetizing storage bit areas contained on a magnetic store memory. In particular, the invention is used on twister memory cards wherein a plurality of magnetic heads are arranged in a side-by-side relationship.

The placing of magnetic heads closely adjacent to each other involves the possibility of cross-talk between heads when recording or erasing. The invention reduces such cross-talk and is also capable of erasing a magnetized bit area with a higher degree of effectiveness than methods previously employed.

The invention is accomplished by the use of particular voltage waveforms and circuits for recording and erasing and by the effective use of shielding material. In particular, an exponentially decaying D.C. voltage is employed for recording (writing) bits and an A.C. voltage modulated by an exponentially decaying D.C. voltage is used for erasing bits. Also, shielding is used between adjacent heads and in the gap between the pole pieces of each head. A choke is used in each writing circuit to pass the D.C. magnetizing (recording) waveforms but to block the A.C. demagnetizing (erasing) waveforms.

The invention may be best understood by reference to the drawings in which.

Figure 3A:
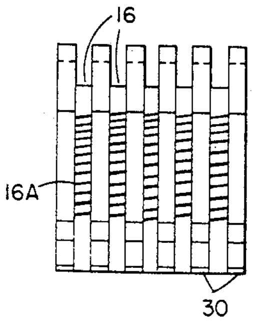
Figure 3B:
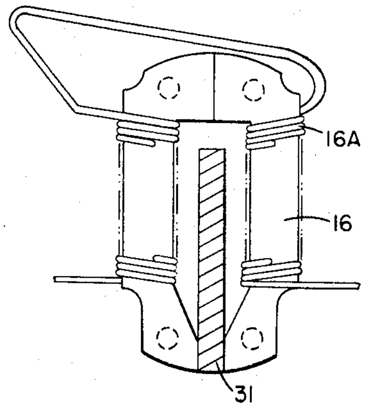
Figure 3C:
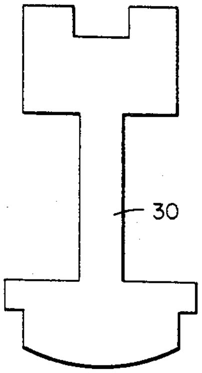
Figure 4:
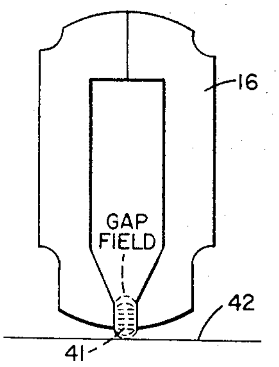
Figure 5:
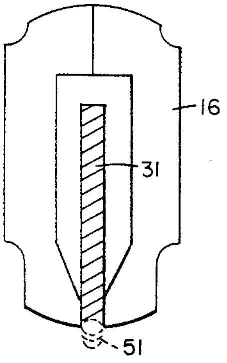

FIGURE 3*a* shows the side-by-side arrangement of recording heads;

FIGURE 3*b* shows a side view of one of the recording heads;

FIGURE 3*c* shows the shape of one of the shields which fits between the heads;

FIGURE 4 shows a recording head with the magnetic gap flux generated thereby; and FIGURE 5 shows a recording head with a gap shield in place and with the resulting gap flux pattern.

Figure 1:
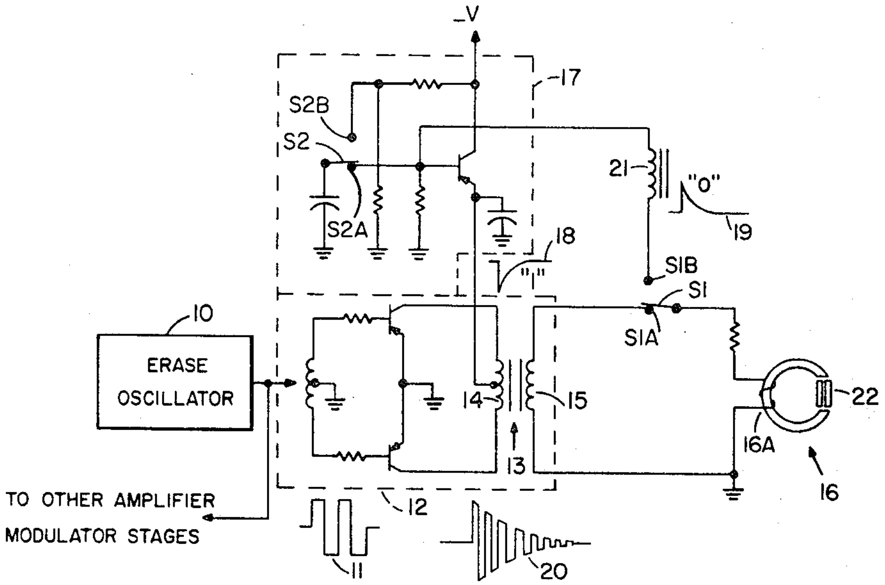
FIGURE 1 shows the circuit diagram for a particular recording head of the invention.

Referring to FIGURE 1, there is shown an erase oscillator 10 which provides an A.C. voltage as shown by waveform 11, which waveform is coupled to the amplifier-modulator contained in dotted line rectangle 12, which includes a transformer 13 having windings 14 and 15. Winding 15 of transformer 13 is connected through contact S1A of switch S1 to the winding 16A of recording head 16. Dotted line rectangle 17 is a generator of exponentially decaying output voltages 18 and 19. Power for the modulator is provided through terminal —V. Output 18 is connected to a center tap on winding 14 of transformer 13 and is used to modulate the A.C. voltage 11. The resulting modulated voltage has the waveform as shown by 20. Output 19 passes through choke 21 to switch contact S1B. The elements 22 are the magnetic bit areas which are magnetized or demagnetized by head 16.

*Operation of FIGURE 1*

If it is desired to record a binary "0," it is necessary to magnetize elements 22 and to record a binary "1," elements 22 are demagnetized. To magnetize elements 22, switch S1 must be in contact with S1B. Switch S2 is then operated to contact S2B, and voltages 18 and 19 are produced by generator 17. Voltage 19 induces current through choke 21 and the winding of head 16, and the elements 22 are magnetized for a binary "0." To demagnetize elements 22, switch S1 must contact S1A. When switch S2 makes contact with S2B, voltages 18 and 19 are generated. Voltage 18 passes to the center tap of winding 14 of transformer 13 and the voltage waveform 20 is generated and passed to head 16. The waveform 20 causes the elements 22 to be demagnetized, and a binary "1" is stored.

Figure 2:
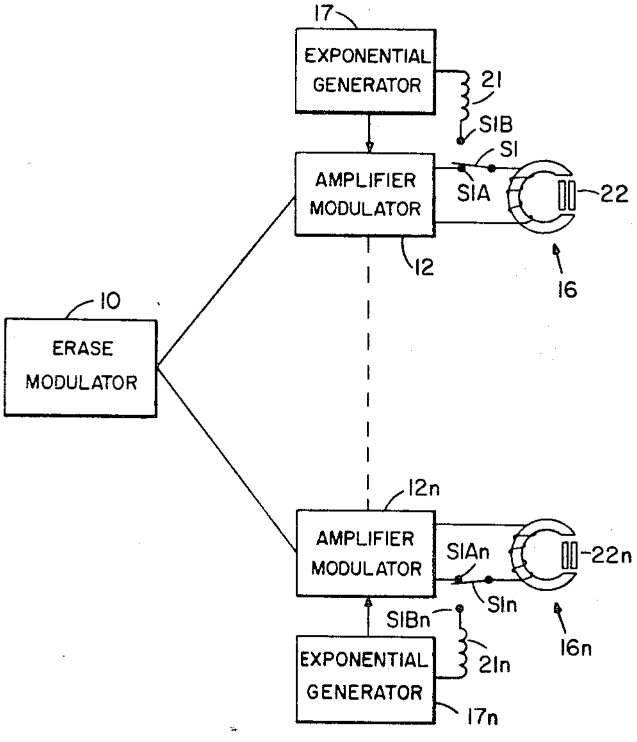
FIGURE 2 shows a partial circuit arrangement of the plural recording heads.

Referring now to FIGURE 2, it can be seen that a plurality of recording heads *n* are employed, with amplifier-modulator 17, choke 21 and switch S1 for each head 16. Only one oscillator 10 is necessary.

FIGURE 3*a* shows the recording heads 16 with windings 16A thereon and with shields 30 between adjacent heads.

FIGURE 3*b* shows the shape of a recording head 16 with its winding 16A. Element 31 is the gap shield.

FIGURE 3*c* shows the shape of shield 31.

Shields 30 and 31 are made of a diamagnetic conductor, such as copper, and act as shields by having eddy currents induced therein by the currents through 16A. These eddy currents, in the case of element 30, tend to confine the flux from 16A in head 16.

Referring to FIGURE 4, the magnetic flux of the head gap would have the shape as shown by 41, and would penetrate only slightly into recording medium 42. With gap shield 31 in place, as shown in FIGURE 5, the gap flux would be diverted and would have the shape as shown by 51.

The various heads 16–**16*n* (FIGURE 2) would normally be simultaneously operated to record a complete column of bits. If one recording head is recording a binary "1" while the immediately adjacent head is recording a binary "0," the possibility of cross-talk between heads exists. The "1" (demagnetizing) pulse may be cross coupled to a head which is correctly recording a "0" (magnetizing) pulse and would result in an erasure of the "0." When a head is recording "0's," switch S1 is in contact with contact S1B, and choke 21 is in circuit with head winding 16A. Choke 21** presents a low impedance to D.C. (for recording "0's") but presents a high impedance to A.C. and negates cross-coupling of A.C.

While a specific embodiment of the invention has been shown, other embodiments may be obvious, in light of this disclosure.

I claim:

1. An apparatus for recording binary 1's and 0's on a magnetizable medium including A.C. voltage generating means, means for generating two exponentially decaying D.C. voltages, means for modulating said generated A.C. voltage with one of said D.C. voltages, a magnetic recording head, and means for alternatively connecting said modulated A.C. voltage or said other of said exponentially decaying D.C. voltages to said recording head, wherein 1's and 0's are respectively recorded on said magnetizable medium.

2. The apparatus of claim 1 wherein said recording head is of a ferromagnetic material and includes two opposed pole pieces with a diamagnetic electrically conductive shield interposed between said pieces.

3. A multichannel magnetic recorder including a plurality of adjacent magnetic recording heads, means for generating two exponentially decaying D.C. voltages on first and second output terminals, said second output terminal being connectable to each of said heads, means for generating an A.C. voltage, individual modulator means connectable to each head for modulating the A.C. voltage with the D.C. voltage from said first output terminal, connecting means for each of said heads for selectively connecting thereto said modulator means or said second output terminal.

4. The recorder of claim 3 further including electrically conductive diamagnetic shields between adjacent heads.

5. The recorder of claim 3 wherein said heads include opposed magnetic pole pieces with an electrically conductive diamagnetic shield between said pole pieces.

6. The recorder of claim 3 further including A.C. choke means between said second output terminal and said connecting means.

7. The method of magnetically recording binary 1's and 0's on a magnetizable medium which comprises the steps of generating an A.C. voltage, generating two exponentially decaying D.C. voltages, modulating the A.C.

voltage with one of said D.C. voltages, connecting said modulated A.C. voltage to a magnetic recording head for recording binary 1's on said magnetizable medium, and alternatively connecting the other D.C. voltage to said magnetic recording head for recording binary 0's on said magnetizable medium.

References Cited

UNITED STATES PATENTS 3,277,454 10/1966 Chao ............ 340—174.1

BERNARD KONICK, *Primary Examiner.*

A. I. NEUSTADT, *Assistant Examiner.*